J. DOBIAS.
WATER GAGE.
APPLICATION FILED OCT. 24, 1911.
1,031,536.
Patented July 2, 1912.
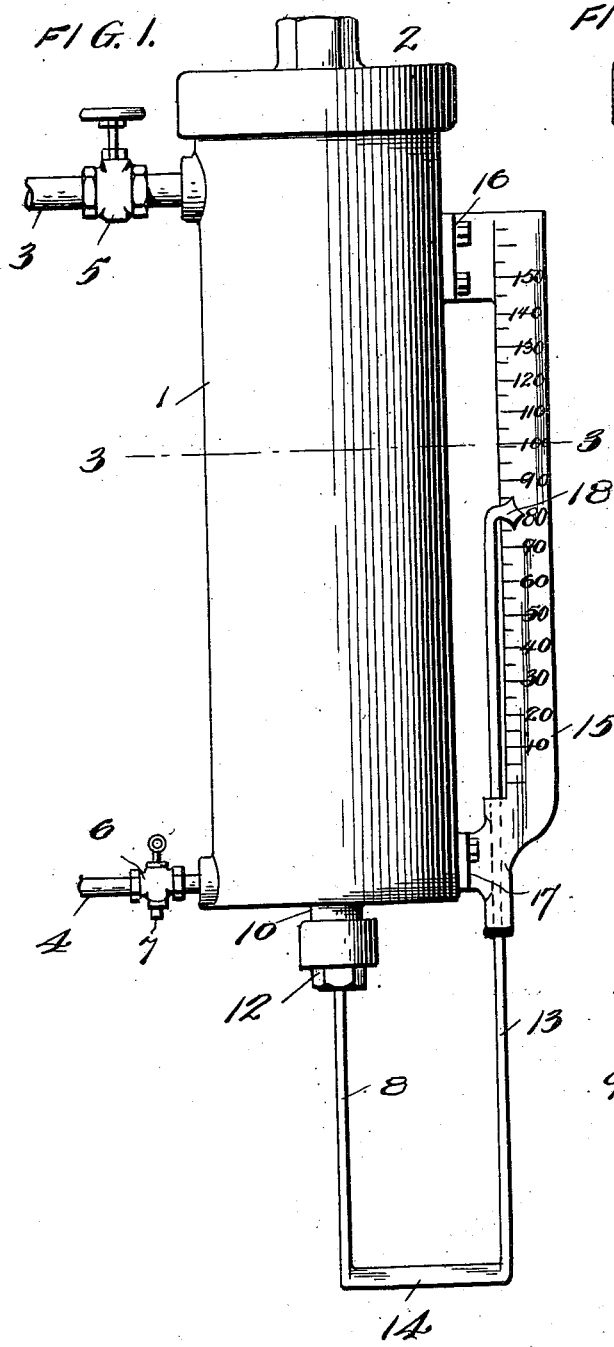
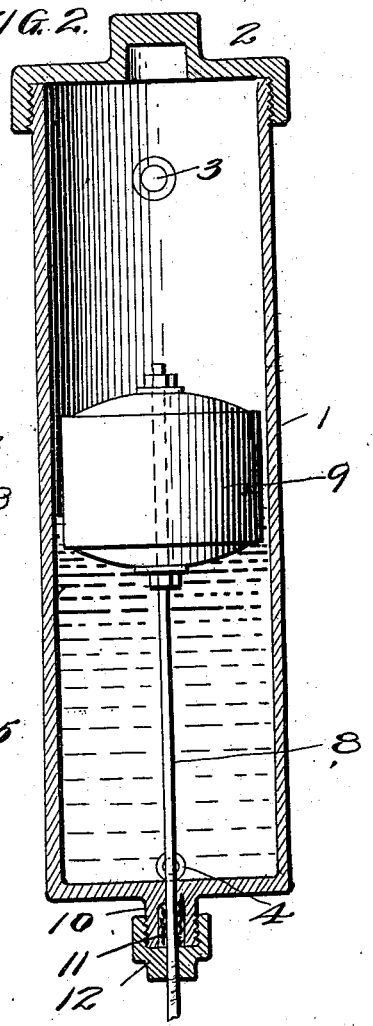
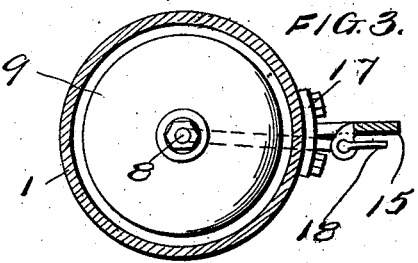
WITNESSES
C. K. Davis
M. E. Moore
Joseph Dobias
INVENTOR
Moore
Attorney

UNITED STATES PATENT OFFICE.

JOSEPH DOBIAS, OF CEDAR RAPIDS, IOWA.

WATER-GAGE.

1,031,536.

Specification of Letters Patent.     Patented July 2, 1912.

Application filed October 24, 1911. Serial No. 656,527.

*To all whom it may concern:*

Be it known that I, JOSEPH DOBIAS, a citizen of the United States, residing at Cedar Rapids, in the county of Linn and State of Iowa, have invented certain new and useful Improvements in Water-Gages, of which the following is a specification.

My invention relates to improvements in water gages and refers particularly to a float-operated water gage for use upon steam boilers and the like to indicate the height or level of the liquid.

Water gages of the type now used upon boilers are subject to many disadvantages and faults, and the object of my invention is to provide a gage which will overcome the objections at present encountered in gages now in use.

One of the most conspicuous and troublesome objections to gages in present usage is the glass indicator employed to register the height or level of the fluid contained in the receptacle. Owing to constant changes of temperature to which the indicating glasses are subjected, they frequently break and the steam or water escapes, thus causing no small amount of trouble and inconvenience. Furthermore, the glasses often become discolored or opaque due to the boiling of the water contained in suspension therein and the subsequent agitation of the water, which matter inorganic matter of the water, which matter clings to the sides of the glass and so blurs the glass as to make the reading of the indications a matter of difficulty.

To overcome these objections, my invention broadly stated, resides in the provision of a water gage which will obviate entirely the use of an indicating glass.

My invention further resides in the provision of a water gage embodying novel features of construction and combination of parts substantially as disclosed herein.

Figure 1 is a side elevation of a water gage embodying my construction. Fig. 2 is a vertical sectional view of the gage, and Fig. 3 is a sectional end view of the device, taken on line 3—3 of Fig. 1.

In the accompanying drawings, in which like characters of reference denote corresponding parts in the several views, I have illustrated one embodiment of the best mode I have so far devised for the practical application of the principles of the invention, it being understood that I may make such changes, alterations and modifications as fall clearly within the scope of and without departing from the spirit or sacrificing any of the advantages of the invention.

The numeral 1 designates the water-containing cylinder or tube having the screw top 2 to admit of and to facilitate the easy access thereto, and has the usual steam and water induction pipes 3 and 4, provided with the check valves 5 and 6.

The numeral 7 designates a small blow-cock located in the water pipe, the purpose of which is to permit draining the cylinder when desired.

The numeral 8 denotes a vertical stem or rod extending partially throughout the vertical length of the cylinder and carrying a float 9 of cork, aluminum or other buoyant material rigidly secured thereon.

As shown in Fig. 2, the stem 8 extends through the lower wall of the cylinder, which is provided with a threaded boss 10, containing suitable packing glands 11, and is engaged by the threaded nipple or boss 12, thus making a water-tight joint to prevent the escape of the suspended liquid.

The stem 8 is continued downwardly to a distance equivalent to the upwardly extending distance of the indicating portion 13 thereof, and said members are united by the horizontal portion 14, formed integral therewith, the stem 8 thus being bent to assume a U shape.

The indicating device for the gage consists of a graduated scale 15 secured to the outer wall of the cylinder 1 by means of the brackets 16 and 17, and the upper end of the portion 13 of the stem is bent to form the indicator or pointer 18.

In use, the rise and fall of the contained liquid is indicated by the subsequent rise and fall of the pointer 18, which is dependent upon the fluctuation of the float 9, adapted to rest upon the surface of the liquid and register its slightest variations.

The importance of having the stem bent in the form shown, is clearly perceptible as the slightest changes in the altitude of the contained liquid is instantly indicated by the coincident rise or fall of the pointer, and the advantages accruing from the substitution of the scale for the water glass are obviously many and important.

The feature of the threaded cap removably secured upon the cylinder is also advantageous, as instant and easy access can thus be had to the cylinder and the cleaning thereof greatly facilitated.

I claim:—

In a water gage, the combination of a cylinder having the entrances on one side for the steam induction pipe and the blow off or drainage pipe and having its upper end open and externally threaded, a screw cap fitting upon said open end, a nipple depending from the lower end of the cylinder and provided with a surrounding space, a threaded stem guiding cap secured upon the nipple, a stem passing through the cap and nipple and carrying upon its upper end a float, said stem being formed with a right angled arm and a vertical rod or extension disposed parallel with reference to the stem and having at its upper free end an indicator, a beam secured to the side of the cylinder and provided with a scale, a guiding sleeve formed on the beam in which the indicator rod moves, and a stuffing gland in the nipple of the cylinder to render the stem water tight in said cylinder.

In testimony whereof I affix my signature in presence of two witnesses.

JOSEPH DOBIAS.

Witnesses:
G. F. BURESH,
L. J. POCHOBRADSKY.

---

Copies of this patent may be obtained for five cents each, by addressing the "Commissioner of Patents, Washington, D. C."